Oct. 24, 1961  W. E. HARRISON ET AL  3,005,380
STRUCTURE FOR RECORDING TIME VALUES
Filed Sept. 8, 1958  3 Sheets-Sheet 1
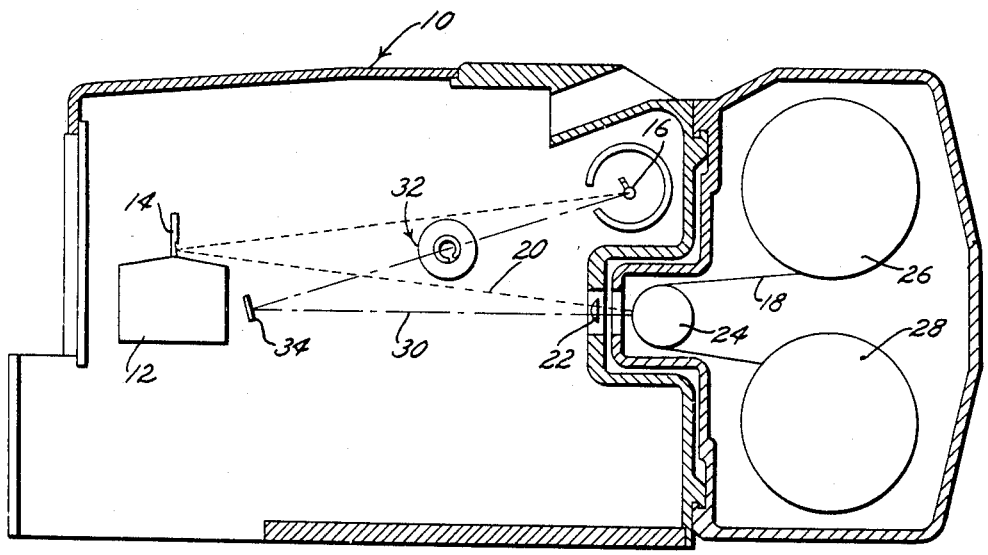
Fig. 1.
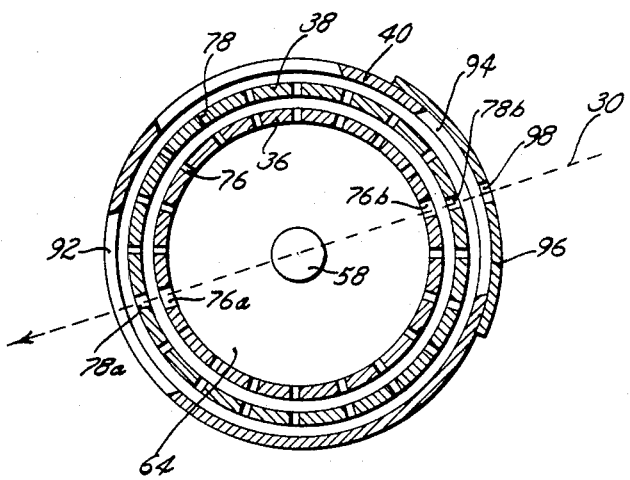
Fig. 7.
INVENTOR.
WAYNE E. HARRISON
ELMER LINNA
BY
ATTORNEY Oct. 24, 1961 W. E. HARRISON ET AL 3,005,380
STRUCTURE FOR RECORDING TIME VALUES
Filed Sept. 8, 1958 3 Sheets-Sheet 2
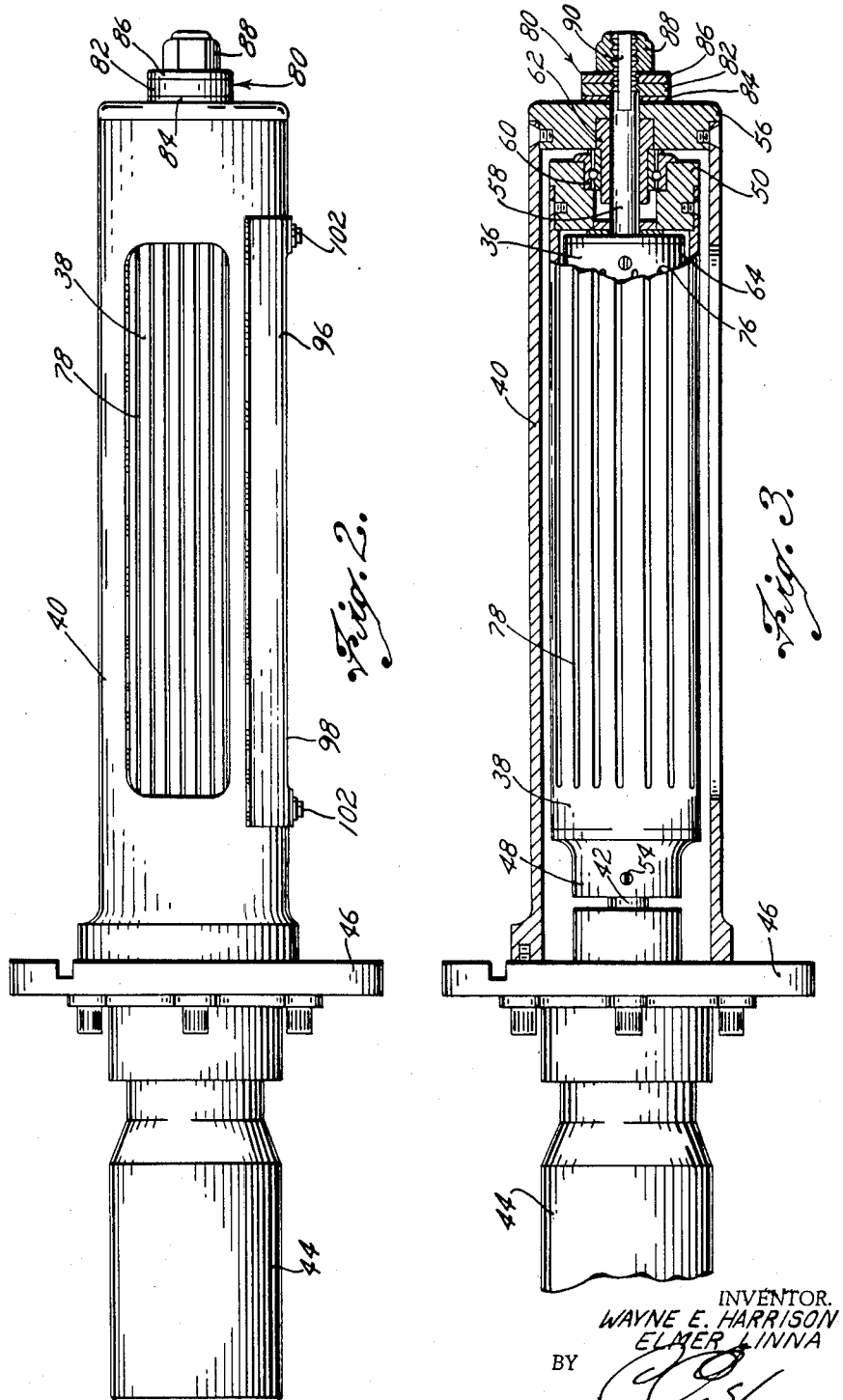
INVENTOR.
WAYNE E. HARRISON
ELMER LINNA
BY
ATTORNEY

INVENTOR.
WAYNE E. HARRISON
ELMER LINNA
BY
ATTORNEY

United States Patent Office 3,005,380
Patented Oct. 24, 1961

3,005,380
STRUCTURE FOR RECORDING TIME VALUES
Wayne E. Harrison and Elmer Linna, Tulsa, Okla., assignors to Midwestern Instruments, Inc., Tulsa, Okla., a corporation of Delaware
Filed Sept. 8, 1958, Ser. No. 759,649
8 Claims. (Cl. 88—61)

This invention relates to improvements in oscillographs and more particularly to a novel timing device for use with photographic media generally, the primary object being to provide structure making it possible to shift automatically from an operation wherein light rays are permitted to fall upon a moving strip rather frequently to an operation wherein there is a longer lapse of time between each projection of the light beam through the timer.

It is commonplace in oscillographs and the like to provide timers which record in terms of $1/10$ and $1/100$ second intervals, with the $1/10$ lines heavier or greater in width than the $1/100$ second lines so as to simplify location of the exact time at a glance when the oscillogram is examined so as to eliminate the necessity of actually counting each $1/100$ second line. If the record travels at a relatively slow rate, it is evident that the $1/100$ second lines would be so close together as to "pile up" to a point of being virtually indistinguishable. Hence, it is desirable to use only the $1/10$ second lines during slow speed operation of the instrument.

It is, therefore, the most important object of the present invention to provide structure for forming timing lines on a moving strip or film that includes rotatable shutter mechanism capable of being operated so as to produce either the aforementioned $1/10$ second timing lines, or the $1/100$ second timing lines and incorporating means to automatically change from one operation to the other as the operator may so desire.

Another object of the present invention is to provide structure for recovering time values having shutter mechanism that is rotatable in either of two directions and which takes advantage of the inherent inertia therein for automatically controlling the shutter mechanism as a function of the reversing of the shutter mechanism itself.

Still another object of the present invention is to provide shutter mechanism that includes relatively telescoped slotted tubes mounted for rotation on coincident axes, and having the slots so arranged as to provide the $1/10$ second timing lines when the tubes rotate together as a unit in one direction and to form the $1/100$ second timing lines when such tubes rotate in the opposite direction.

A further object of the present invention is to incorporate within the said shutter mechanism, novel brake means that may be adjusted to permit the relative rotation between the tubes, while at the same time, eliminating any tendency of the slots to become improperly misaligned at any time during continuous rotation in one or the other direction.

In the drawings:

FIG. 1 is an optical diagram of an oscillograph employing structure for recording time values made pursuant to our present invention.

FIG. 2 is an enlarged plan view of the shutter mechanism itself entirely removed from the oscillograph.

FIG. 3 is a view similar to FIG. 2 but showing the outer housing in longitudinal section and parts broken away to reveal details of construction.

FIG. 7 is a transverse, cross-sectional view still further enlarged similar to FIG. 6, taken substantially on line 7—7 of FIG. 4 and illustrating a different relative position between the tubes than shown in FIG. 6.

Figure 4:
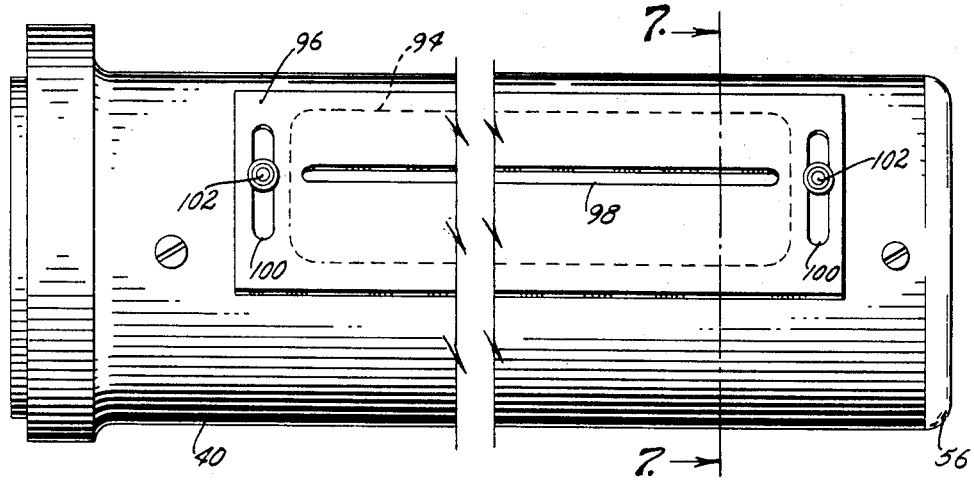
FIG. 4 is an elevational view still further enlarged showing the aforementioned housing entirely removed from its support.
Figure 5:
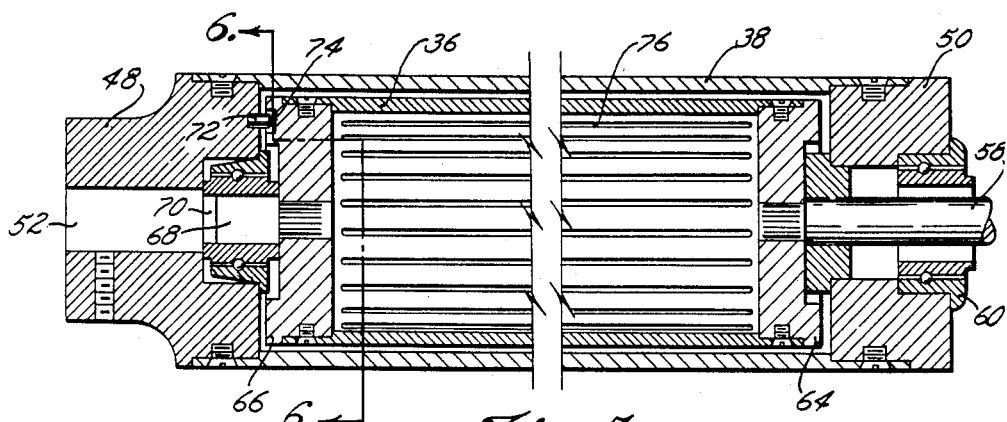
FIG. 5 is a longitudinal, cross-sectional view still further enlarged, showing the two tubes of the shutter mechanism.

The oscillograph chosen for illustration in FIG. 1 of the principles of the instant invention, includes a case 10 containing magnetic structure 12 provided with a plurality of galvanometers 14 in the usual manner. Each of such galvanometers 14 is provided with an oscillatory coil assembly that carries a small reflecting mirror, and light rays are directed to such mirrors from a lamp source 16, which light rays are reflected to a moving strip or film 18 by the galvanometer mirrors, line 20 depicting the path of travel of the recording beam which passes through a collimating lens 22. Film 18 is trained over a metering roller 24 and moves at a predetermined rate of speed from a storage roller 26 to a take-up roller 28.

The timing line path is designated by the numeral 30, the beam emanating from the lamp source 16 passing through timer 32 forming the subject matter of the present invention, impinging upon a timer mirror 34, and reflecting back to the film 18 through lens 22.

The nature of the timer 32 depicted graphically in FIG. 1 is illustrated in detail by FIGS. 2 to 7 inclusive and includes shutter mechanism consisting of a pair of tubes 36 and 38 rotatably supported by a housing 40 therewithin. The three elongated, cylindrical parts 36, 38 and 40 are relatively telescoped and provided with coincident axes, which axes are aligned with drive shaft 42 (FIG. 3) of a small synchronous motor 44. The reversible electric motor 44, as well as the housing 40, is mounted on a supporting plate 46 therebetween. Plate 46 forms a part of suitable framework (not shown) employed to mount the entire unit 32 within the casing 10 of the oscillograph shown in FIG. 1.

The outermost shutter tube 38 is provided with ends 48 and 50, the former of which receives drive shaft 42 within bore 52 and is attached to shaft 42 by a setscrew 54. The opposite end 50 of the outer tube 38 is supported by end 56 of housing 40 through the medium of a shaft 58. To this end, a bearing 60 carried by the end 50, receives a bushing 62 which surrounds the shaft 58 and is press-fitted into the end 56.

The inner shutter tube 36 is in turn rotatably supported by the tube 38 through the medium of the shaft 58 which is press-fitted into an end 64 for the tube 36. The opposite end 66 of tube 36 has a stub shaft 68 which extends into a bearing 70 carried by the end 48 of tube 38.

Means is provided for interconnecting the tubes 36 and 38 for rotation together as a unit, yet providing for limited rotation relatively. It includes a small pin 72 extending inwardly from end 48 for tube 38 (FIGS. 5 and 6) and disposed radially from the axes of rotation of tubes 36 and 38. An enlarged opening 74 somewhat larger in diameter than the diameter of the pin 72 receives the pin 72 as is clear in FIG. 6.

A plurality of pairs of diametrically opposed openings 76 and 78 are provided in tubes 36 and 38 respectively, such openings 76 and 78 being in the form of relatively narrow, elongated slots extending substantially the full length of the corresponding tubes. While the number of slots in the tubes 36 and 38 may be varied within the principles of the instant invention, by virtue of the fact that the timer 32 is designed to operate in terms of $1/10$ and $1/100$ seconds as above indicated, and further, because of the fact that the motor 44 is designed to operate at 300 r.p.m. between eighteen slots 76 and twenty slots 78 are provided in the tubes or drums 36 and 38 respectively.

The widths of eighteen of the slots 76 are identical, but one pair of diametrically opposed slots in the tube 36, designated 76a and 76b, are appreciably wider than the remaining eighteen slots 76 in the tube 36.

By the same token, eighteen of the slots 78 in the tube 38 are equal in width to the aforementioned eighteen slots 76 in tube 36. But, here again, one pair of diametrically opposed slots in the drum 38 is of increased width and designated 78a and 78b, it being noted however, that slots 78a and 78b are narrower than the proximal slots 76a and 76b.

Freedom of relative rotation between the tubes 36 and 38 is retarded by adjustable brake means shown in FIGS 2 and 3 of the drawings. Such brake 80 includes a tension washer 82 made from sponge rubber or other pliable frictionable material, disposed between a clutch disc 84 in the nature of a relatively hard plastic frictionable material such as manufactured under the trademark "Teflon," and a metallic clutch washer 86, together with an adjusting nut 88.

The parts 82, 84 and 86 of the brake or clutch 80 are centrally perforated to receive the shaft 58, such perforations being formed complementally with opposed flats 90 on shaft 58 to rotate therewith and with respect to end 56 of housing 40 which the disc 84 frictionally engages. Nut 88 is threaded on shaft 58 and the aforementioned parts 82, 84 and 86 are clamped between end 56 and nut 88.

Housing 40 is provided with a pair of relatively large, rectangular openings 92 and 94 in diametrically opposed relationship as best seen in FIG. 7, the latter of which is covered by a plate 96 having a longitudinal slot 98 that is wider than the widest slots 76a and 76b. Transverse slots 100 (FIG. 4) in the plate 96, receive fasteners 102 for attaching the plate 96 to the housing 40.

It can now be appreciated that the timer 32 is mounted in the casing 10 of the oscillograph substantially in the attitude illustrated by FIG. 7 within the path of light rays emanating from lamp 16 and traveling to the reflecting mirror 34, such path being also designated by the numeral 30 in FIG. 7. It is obvious also that the beam from lamp 16 may be caused to properly impinge on the mirror 34 so as to be projected correctly in the film 18 through the lens 22 by adjustment of the plate 96 on the housing 40. Loosening of the fasteners 102 permits shifting of the plate 96 so as to move the slot 98 thereof circumferentially of the housing 40.

Figure 6:
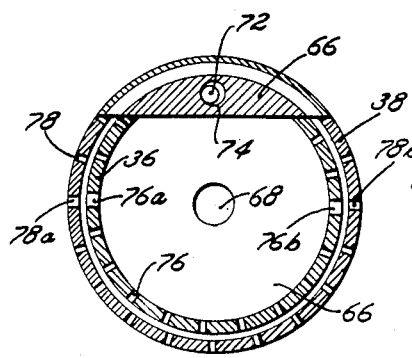
FIG. 6 is a transverse, cross-sectional view taken on irregular line 6—6 of FIG. 5.

When the operator closes the control switch (not shown) for the motor 44 exteriorly of casing 10, to cause the motor 44 to rotate in one direction, the two shutter tubes 36 and 38 are rotated simultaneously as a unit, pin 72 transmitting rotary movement from tube 38 to tube 36 as pin 72 engages one side of the opening 74 in the manner illustrated by FIG. 6.

Thus, when the relative position of the tubes 36 and 38 is as shown in FIG. 6, eighteen of the slots 76 are out of alignment with the corresponding eighteen slots 78. But, slots 76a, 76b, 78a and 78b are in alignment. Consequently, during each cycle of rotation of the two tubes 36 and 38 as a unit anticlockwise viewing FIG. 6, such aligned slots will align with slots 92 and 98 of housing 40 twice, permitting the beam from lamp 16 to project through the timer 32 and form the aforementioned $\frac{1}{10}$ second timing lines on the continuously advancing film 18 transversely of the latter.

When the operator reverses the motor 44 to initiate rotation of the outer tube 38 in the opposite direction (clockwise viewing FIG. 6), the pin 72 will shift to the opposite side of the opening 74 before rotary movement is imparted through pin 72 to the inner tube 36 in such opposite direction. Such shifting of the pin 72 automatically changes the relative position of the tubes 36 and 38 from that shown by FIG. 6 to that illustrated in FIG. 7 wherein it is noted that slots 76a, 76b, 78a and 78b are still in alignment. Additionally, however, all of the eighteen smaller slots 76 and the eighteen smaller slots 78 are in alignment. Consequently, the twenty pairs of diametrically opposed slots will successively align with openings 92 and 98 and thereby form $\frac{1}{10}$ and $\frac{1}{100}$ second lines on the tape 18. Such lines will be readily distinguishable on the film 18 because of the increased widths of the slots 78a and 78b as compared with the eighteen narrower slots in drums 36 and 38. However, if the speed of travel of the recording medium 18 is relatively fast and such as to cause the $\frac{1}{100}$ second lines to "pile up," the operator desirably will shift to the alternate operation by again reversing motor 44 so as to cause the tubes 36 and 38 to assume the relative position shown in FIG. 6.

Undue oscillation or relative shifting between the tubes 36 and 38 during rotation in either direction is prevented by the brake or clutch 80, the tension whereof may be adjusted through use of nut 88. Manifestly, such adjustment should not be so tight as to prevent free automatic reversal by inertia of the relative positions of the tubes 36 and 38 as a consequence of reversing the motor 44 in the manner above explained.

Having thus described the invention what is claimed as new and desired to be secured by Letters Patent is:

1. In structure for forming timing lines on a moving strip in an oscillograph, shutter mechanism including a first and a second tube, said tubes being rotatable together as a unit, said first tube being movable with respect to said second tube, each tube being provided with a plurality of pairs of diametrically opposed openings, the openings of the tubes being aligned when said first tube is moved relative to the second tube in one direction, one pair only of the openings of said first tube aligning with but one pair of openings of said second tube when the first tube is moved in the opposite direction relative to said second tube.

2. In structure for forming timing lines on a moving strip in an oscillograph, shutter mechanism including a first and a second tube, said tubes being rotatable together as a unit, said first tube being rotatable with respect to said second tube, each tube being provided with a plurality of pairs of diametrically opposed openings, the openings of the tubes being aligned when said first tube is rotated relative to the second tube in one sirection, one pair only of the openings of said first tube aligning with but one pair of openings of said second tube when the first tube is rotated in the opposite direction relative to said second tube.

3. In structure for forming timing lines on a moving strip in an oscillograph, shutter mechanism including a first and a second tube, said tubes being in telescoping relationship, and rotatable together as a unit, said first tube being rotatable with respect to said second tube, each tube being provided with a plurality of pairs of diametrically opposed openings, the openings of the tubes being aligned when said first tube is rotated in one direction relative to the second tube, one pair only of the openings of said first tube aligning with but one pair of openings of said second tube when the first tube is rotated in the opposite direction relative to said second tube.

4. In structure for forming timing lines on a moving strip in an oscillograph, shutter mechanism including a first and a second tube, said tubes being in telescoping relationship, each tube being provided with a plurality of pairs of diametrically opposed openings; and means interconnecting the tubes for rotation together as a unit, said means providing limited rotation of said first tube relative to the second tube, the openings of the tubes being aligned when said first tube is rotated in one direction relative to said second tube, one pair only of the openings of said first tube aligning with but one pair of openings of said second tube when the first tube is rotated in the opposite direction relative to said second tube.

5. In structure for forming timing lines on a moving strip in an oscillograph, shutter mechanism including a first rotatably mounted tube; a second tube rotatably carried by the first tube, said tubes being telescoped one within the other; and means limiting the extent of rotation of one of the tubes with respect to the other tube whereby, upon rotation of said one tube in opposite directions with respect to the other tube the positions of the tubes relative to each other change automatically, each tube having a plurality of pairs of diametrically opposed openings, the openings of the tubes being aligned when said one tube is rotated in one direction with respect to the other tube, one pair only of the openings of said one tube aligning with but one pair of openings in the other tube when the one tube is rotated in the opposite direction with respect to the other tube.

6. In structure for forming timing lines on a moving strip in an oscillograph, shutter mechanism including a first rotatably mounted tube; a second tube rotatably carried by the first tube, said tubes being telescoped one within the other; means limiting the extent of rotation of one of the tubes with respect to the other tube whereby, upon rotation of said one tube in opposite directions with respect to the other tube the positions of the tubes relative to each other change automatically, each tube having a plurality of pairs of diametrically opposed openings, the openings of the tubes being aligned when said one tube is rotated in one direction with respect to the other tube, one pair only of the openings of said one tube aligning with but one pair of openings in the other tube when the one tube is rotated in the opposite direction with respect to the other tube; and brake means for retarding rotation of said one tube.

7. In structure for forming timing lines on a moving strip in an oscillograph, shutter mechanism including a first rotatably mounted tube; a second tube rotatably carried by the first tube, said tubes being telescoped one within the other; and means limiting the extent of rotation of one of the tubes with respect to the other tube whereby, upon roation of said one tube in opposite directions with respect to the other tube the positions of the tubes relative to each other change automatically, each tube having a plurality of pairs of diametrically opposed openings, the openings of the tubes being aligned when said one tube is rotated in one direction with respect to the other tube, one pair only of the openings of said one tube aligning with but one pair of openings in the other tube when the one tube is rotated in the opposite direction with respect to the other tube, said one pair of openings of said other tube being sufficiently large to always align with said one pair of openings of the one tube.

8. In structure for forming timing lines on a moving strip in an oscillograph, shutter mechanism including a first rotatably mounted tube; a second tube rotatably carried by the first tube, said tubes being telescoped one within the other; and means limiting the extent of rotation of one of the tubes with respect to the other tube whereby, upon rotation of said one tube in opposite directions with respect to the other tube the positions of the tubes relative to each other change automatically, each tube having a plurality of pairs of diametrically opposed openings, the openings of the tubes being aligned when said one tube is rotated in one direction with respect to the other tube, one pair only of the openings of said one tube aligning with but one pair of openings in the other tube when the one tube is rotated in the opposite direction with respect to the other tube, said one pair of openings of each tube being larger than the remaining openings.

References Cited in the file of this patent

UNITED STATES PATENTS

| | | |
|---|---|---|
| 2,667,812 | Miller | Feb. 2, 1954 |
| 2,687,337 | Alford | Aug. 24, 1954 |
| 2,816,002 | Baranowski et al. | Dec. 10, 1957 |